H. HALLAM.
ABRADING DEVICE.
APPLICATION FILED NOV. 9, 1912.
Reissued Dec. 10, 1912. 13,493.
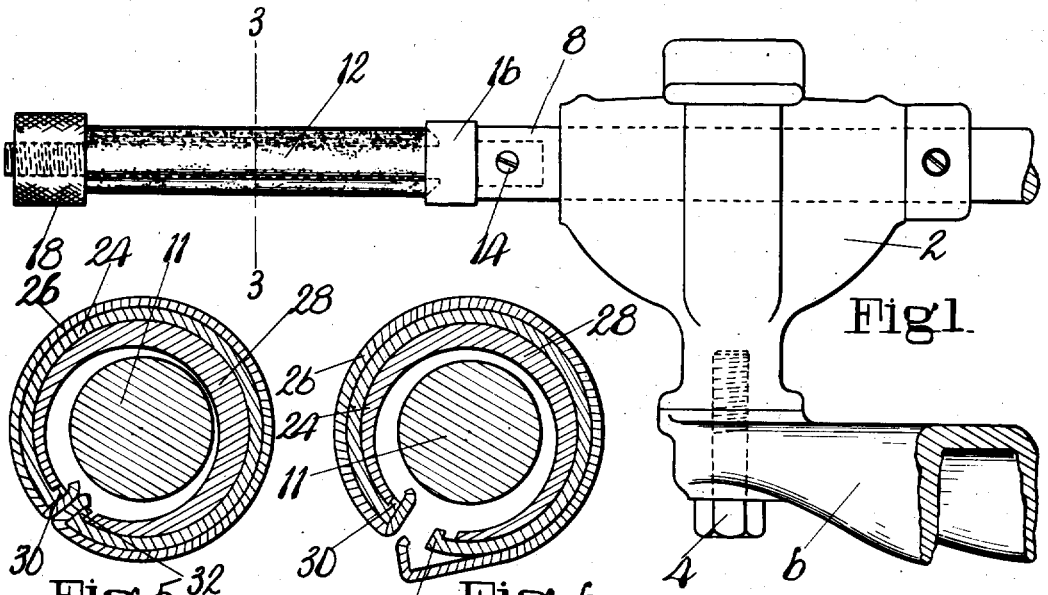
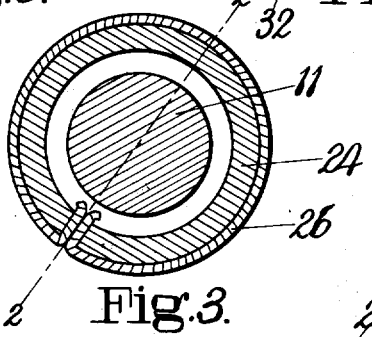
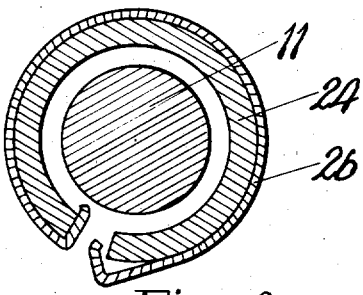
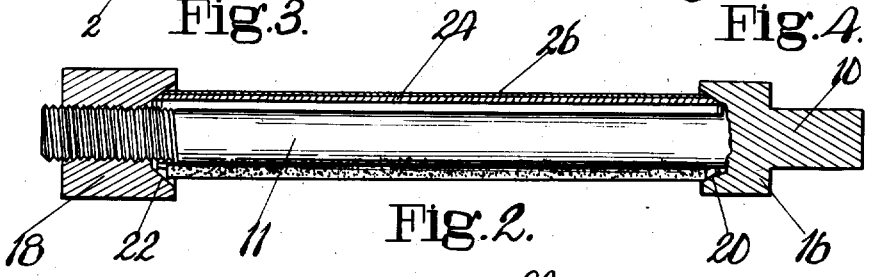
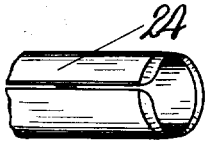
WITNESSES:
Elizabeth C. Crafe
Marie Louise Steinmann
INVENTOR.
Harry Hallam
By his Attorney
Nelson W. Howard

UNITED STATES PATENT OFFICE.

HARRY HALLAM, OF LEICESTER, ENGLAND, ASSIGNOR TO UNITED SHOE MACHINERY COMPANY, OF PATERSON, NEW JERSEY, A CORPORATION OF NEW JERSEY.

ABRADING DEVICE.

13,493. Specification of Reissued Letters Patent. Reissued Dec. 10, 1912.

Original No. 1,030,778, dated June 25, 1912, Serial No. 422,822. Application for reissue filed November 9, 1912. Serial No. 730,491.

*To all whom it may concern:*

Be it known that I, HARRY HALLAM, a subject of the King of England, residing at Leicester, Leicestershire, England, have invented new and useful Improvements in Abrading Devices, of which the following is a specification.

This invention relates to buffing or abrading devices and in particular to supports for removable covers having buffing or abrading surfaces.

An object of the invention is to provide a simple and compact support for a buffing or abrading cover which is so constructed and arranged that a new cover may be quickly and conveniently adjusted upon the support to take the place of the old one.

A further object of the invention is to provide simple and efficient means for effecting a clamping of the cover in adjusted position upon its support, said means being preferably arranged to aid also in effecting a proper adjustment of the cover.

With the foregoing and other general objects in view, the invention is herein shown in its application to a small buffing or abrading roll such as may conveniently be used in the manufacture of boots and shoes for scouring the breasts of Louis or other heels.

In the preferred embodiment of the invention, the cover support comprises a hollow, preferably cylindrical, body about which the cover is wrapped, said body being provided with a longitudinal slit extending from its periphery to its hollow interior. Preferably the body above referred to, which, in the illustrated embodiment, is shown as comprising a longitudinally slitted sleeve, is so constructed and arranged that movement of the edges of the longitudinal slit out of a predetermined relation to each other develops a force tending to restore them to such predetermined relation, means being preferably provided for bringing said edges into a different relation to each other. In the preferred construction also the edges of the slit in one of their before-mentioned relations to each other are so spaced as to receive readily between them the inturned ends of a buffing or abrading cover and in the other of said before-mentioned relations they effect the clamping between them of said inturned ends of said cover.

A construction in which the edge of the slit in the cover support have a tendency to remain in, or to return to, a predetermined relation to each other may conveniently be provided by making the body about which the cover is wrapped of elastic material, or by providing elastic means which operates upon said body, or by a combination of both the expedients mentioned.

As indicated above, the cover is preferably confined upon its support by having its inturned ends clamped between the edges of the longitudinal slit in said support and in the preferred embodiment of the invention such clamping may conveniently be effected by a relative, substantially circumferential, movement of the edges of said slit from the open position in which they receive readily between them the inturned ends of the cover to the closed position in which the said inturned ends are clamped by the edges. Such relative circumferential movement of the edges by causing an increase in the curvature of the sleeve by a contraction of its diameter tends to draw the cover tightly about the outer surface of the sleeve and to take up such looseness as it is advisable to provide for convenience in slipping the cover over the sleeve.

The cover support is preferably mounted upon a carrier, shown in the illustrated embodiment as a rotating spindle by which movement is imparted to it and in the preferred embodiment of the invention the cover support is constructed and arranged for convenient removal from its carrier, whereby it may be readily brought into such position that a new cover may be quickly and conveniently adjusted upon it to take the place of the old one. Preferably the means for confining the support upon its carrier serves to effect one of the relative circumferential movements of the edges of the longitudinal slit in the support. The means for confining the support upon its carrier has preferably, in addition to the function just referred to, also a cover confining function.

In the accompanying drawings, Figure 1 is an elevation of a part of a buffing or abrading machine provided with one of the small rolls above mentioned; Fig. 2 is a longitudinal section on the line 2—2 of Fig.

3 through the roll shown in Fig. 1, this view representing the parts in full size; Fig. 3 is an enlarged section on the line 3—3 of Fig. 1 showing the cover clamped between the edges of the longitudinal slit in the roll; Fig. 4 is a section similar to Fig. 3, but showing the edges spaced apart for the reception of, or removal of, the inturned edges of the cover; Fig. 5 is a section similar to Fig. 3 of a roll provided with an internal spring for spreading apart the edges of the slit; Fig. 6 is a view similar to Fig. 4 of a roll provided with an internal spring and showing the relative positions of the cover, sleeve and spring when the edges of the longitudinal slit are spaced apart for the reception of, or removal of, the cover; Fig. 7 is a perspective view of one end of the longitudinally slitted sleeve showing the enlargement of the slit at its end.

In Fig. 1 is shown a head 2 attached by a bolt 4 to a standard or bracket 6 and supporting in suitable bearings a rotatable shaft 8. The shaft 8 is provided at one end with a socket to receive the shank or stem 10 of the buffing or abrading roll 12. The shank or stem 10 is a part of the central support or spindle 11 of the roll 12 and this support or spindle, when attached to the shaft 8 by a screw 14 passing through the shaft and through a hole in the shank or stem 10, constitutes a reduced extension of the shaft 8. At one end of the spindle 11 is a fixed collar or flange 16 preferably integral with the spindle, and at the other end which is screw threaded is a knurled cap or nut 18. The fixed collar or flange 16 and the nut 18 are provided with coned recesses 20 and 22, respectively, which form seatings for and support the ends of a sleeve 24 provided with a longitudinal slit extending throughout its length. The sleeve 24 constitutes a support for a buffing or abrading cover which may be a sheet of sandpaper or other suitable abrasive material and the inturned lips of the cover are adapted to be received between the edges of the longitudinal slit in the sleeve, as shown in Figs. 3, 4, 5 and 6. The cover 26 may be conveniently placed upon the support 24 by unscrewing the nut 18 from the spindle, inserting the edges of the inturned ends within the slit in the sleeve or support 24 and sliding the cover lengthwise over the support. It will be noted by an inspection of Fig. 7 that the edges of the slit at the ends of the sleeve are curved back to permit the ready insertion of the edges of the inturned ends or lips of the cover.

When the cover has been placed in adjusted position upon the support the knurled cap or nut 18 is screwed in on the spindle 11 causing the conical recesses 20 and 22 in the flange 16 and the nut 18, respectively, to engage the ends of the sleeve 24, thereby causing it to contract and grip the inturned ends or lips of the cover between the edges of the longitudinal slit, thus drawing the cover tightly on the surface of the sleeve. The ends of the sleeve 24 may be conveniently tapered to correspond with the coned portions of the flange 16 and the nut 18. This tapering serves to guide the ends of the sleeve more readily into the coned recesses and also facilitates placing a cover on the support.

It will be noted from an inspection of Figs. 3 and 4 that the bending of the sleeve 24 from the shape shown in Fig. 4 into the shape shown in Fig. 3 and the corresponding curving in of the cover 26 tends to tighten the cover somewhat upon the outer surface of the sleeve, since the bending by increasing the curvature of the sleeve lengthens its outer surface somewhat and at the same time shortens the inner surface of the cover. The sleeve shown in Figs. 3 and 4 is made of elastic material and is so constructed that when its ends are not confined by the flange 16 and the nut 18 the edges of the slit will be held apart, as shown in Fig. 4.

In Figs. 5 and 6 is shown a modification of the construction shown in Figs. 3 and 4. In this modification an internal spring 28 is provided for expanding the sleeve 24, this spring being substantially crescent-shaped in cross-section. Inturned lips or flanges on the sleeve 24 tend to keep this spring 28 in proper position within the sleeve. It will be noted by an inspection of Fig. 6 that when the edges of the longitudinal slit in the sleeve are spread apart the ends of the spring do not extend into contact with the inturned lips upon the sleeve, this being due to the shortening of the outer surface of the spring by its expansion and the lengthening of the inner surface of the sleeve. In Fig. 5, which shows the edges of the slit in clamping relation, it will be noted that the ends of the spring extend nearly into contact with the inturned lips 30 and 32.

It is obvious that the position with respect to each other in which the edges of the slit are yieldingly held and the position with respect to each other into which said edges are moved by the action of members provided with conical surfaces upon the ends of the sleeve may both be varied without departing from the spirit of this invention.

It will be noted that in the illustrated embodiment of the invention the dimensions of the roll are such that when a cover of material not too flexible is placed upon the longitudinally slitted sleeve in the manner hereinbefore described, by inserting the edges of the inturned lips in the end of the slit and sliding the cover longitudinally over the sleeve, if the slit be of a width substantially twice the thickness of the cover the inturned lips on the cover will be confined so that they cannot readily straighten back into line with the outer surface, will thus serve as hooks acting against the edges of the slit and will therefore offer considerable resistance to circumferential displacement of the cover in either direction, even when not clamped between said edges. By cutting back the edges of the slit at the end into which the edges of the lips are introduced when the cover is to be placed upon the sleeve, ready introduction of the lips into a slit of a width substantially only twice the thickness of the cover is facilitated.

The resistance of the cover to circumferential displacement either when clamped or when unclamped may be increased by permitting the lateral edges of the cover to extend somewhat into the coned recesses in the collar or flange 16 and nut 18, as shown in Fig. 2.

Although as hereinbefore pointed out the preferable method of placing the cover upon the sleeve is by forming the cover into substantially the shape of the sleeve but with inturned lips at its ends, inserting the edges of the inturned lips of the cover into the end of the slit in the sleeve and sliding the cover longitudinally over the sleeve, especially when the roll is of the dimensions of the one herein illustrated and especially when it is desired that the slit in its open position shall not be of a width much greater than twice the thickness of the cover, nevertheless it will be obvious that the cover may be applied to the sleeve in other ways, as for example, by wrapping it around the sleeve and introducing its inturned ends either together or in succession into the slit. A construction of this kind, in which the inturned ends of the abrasive cover are clamped between the edges of a longitudinal slit in a hollow cover support and in which the cover is placed upon the cover support by inserting the edges of the inturned ends in the slit and sliding the cover longitudinally over the support, has an advantage over constructions hitherto used, in that the formation of a hump in the cover at the point of clamping may be easily avoided.

In the appended claims the terms "abrading" and "abrasive" will be used for convenience of expression to describe any kind of grinding or polishing cover applicable to constructions of this kind.

Having described my invention, what I claim as new and desire to secure by Letters Patent of the United States is:—

1. An abrading device comprising, in combination, a spindle, a resilient sleeve surrounding said spindle and provided with a longitudinal slit, and means carried by said spindle and arranged to hold said sleeve in spaced relation to said spindle.

2. An abrading device comprising, in combination, an abrasive cover inturned at its ends, a longitudinally slitted sleeve of elastic material, the slit in said sleeve being adapted to receive between its edges the inturned ends of said abrasive cover, and means for contracting said sleeve to cause said edges to clamp said inturned ends between them, said means being constructed and arranged to overlap and confine the lateral edges of said cover upon said sleeve.

3. An abrading device comprising, in combination, an abrasive cover inturned at its ends, a longitudinally slitted sleeve of elastic material, the slit in said sleeve being adapted to receive between its edges the inturned ends of said abrasive cover and being enlarged at one end to permit the ready insertion of the edges of said inturned ends, and means for contracting said sleeve to cause said edges to clamp said inturned ends between them.

4. An abrading roll comprising, in combination, an abrasive cover having inturned lips at its ends, a spindle, a longitudinally slitted sleeve removably mounted upon said spindle and adapted to receive within its slit the inturned lips of said cover, and means for confining said sleeve upon said spindle, comprising a collar rigid with said spindle and having a coned recess arranged to engage one end of said sleeve, and a member adjustable toward and from said collar upon said spindle and having a coned recess arranged to engage the other end of said sleeve.

5. In an abrading device the combination with a hollow cover support provided with a longitudinal slit the width of which may be varied, of yielding means for holding the edges of said slit in a predetermined relation to each other and positive means for bringing said edges into a different relation to each other, said edges when in one of the before-mentioned relations being spaced to receive readily between them the inturned ends of an abrasive cover and when in the other of said before-mentioned relations effecting a clamping between them of said inturned ends of said cover.

6. An abrasive roll having, in combination, an abrasive cover, a substantially cylindrical support for said cover, said support being provided with a longitudinal slit the edges of which are yieldingly held in a predetermined relation to each other, and means for bringing said edges into a different relation.

7. An abrasive roll having, in combination, an abrasive cover, and clamping means for gripping said cover in place, said clamping means comprising a substantially cylindrical support for said cover, said support being provided with a longitudinal slit, and positive means for causing the diameter of said cylinder to decrease.

8. A device for holding an abrasive cover comprising a sheet of material of approximately the shape of a hollow cylinder, but having its ends normally separated, and means for crowding said ends toward each other to grip the ends of the cover between them.

In testimony whereof I have signed my name to this specification in the presence of two subscribing witnesses.

HARRY HALLAM.

Witnesses:

FREDERICK WILLIAM WORTH,
JOSHUA COOK.